(12) United States Patent
Liang et al.

(10) Patent No.: US 10,600,208 B2
(45) Date of Patent: Mar. 24, 2020

(54) OBJECT DETECTING DEVICE, OBJECT DETECTING METHOD AND NON-TRANSITORY COMPUTER-READABLE MEDIUM

(71) Applicant: INDUSTRIAL TECHNOLOGY RESEARCH INSTITUTE, Hsinchu (TW)

(72) Inventors: Pei-Jung Liang, Taichung (TW); Wei-Hao Lai, New Taipei (TW)

(73) Assignee: INDUSTRIAL TECHNOLOGY RESEARCH INSTITUTE, Chutung, Hsinchu (TW)

(*) Notice: Subject to any disclaimer, the term of this patent is extended or adjusted under 35 U.S.C. 154(b) by 136 days.

(21) Appl. No.: 16/007,859

(22) Filed: Jun. 13, 2018

(65) Prior Publication Data
US 2019/0197729 A1    Jun. 27, 2019

(30) Foreign Application Priority Data
Dec. 21, 2017   (TW) ............................. 106145074 A

(51) Int. Cl.
*G06N 3/08*     (2006.01)
*G06K 9/62*     (2006.01)
(Continued)

(52) U.S. Cl.
CPC .............. *G06T 7/75* (2017.01); *G06K 9/6227* (2013.01); *G06K 9/6267* (2013.01); *G06K 9/66* (2013.01);
(Continued)

(58) Field of Classification Search
CPC .. G06K 9/6227; G06K 9/6267; G06N 3/0454; G06N 3/08; G06T 7/90
See application file for complete search history.

(56) References Cited

U.S. PATENT DOCUMENTS 6,580,087 B1 * 6/2003 Suzuki ............... G01N 21/9501
                                                        250/559.4
2015/0331908 A1   11/2015 Duffy
(Continued)

FOREIGN PATENT DOCUMENTS

CN        1317673 C      5/2007
CN      105184362 A     12/2015
(Continued)

OTHER PUBLICATIONS

Surat Teerapittayanon, et al "BranchyNet: Fast inference via early exiting from deep neural networks," *2016 23rd International Conference on Pattern Recognition (ICPR)*, Cancun, 2016, pp. 2464-2469.
(Continued)

*Primary Examiner* — David Bilodeau
(74) *Attorney, Agent, or Firm* — Muncy, Geissler, Olds & Lowe, PC

(57) ABSTRACT

An object detecting device, an object detecting method and a non-transitory computer-readable medium are provided. The object detecting method includes the following steps: A classifier generates a current color image and a current gray scale image. The classifier generates an initial characteristic pattern from the current color image via a neural network algorithm. The classifier adjusts a current dimension of the initial characteristic pattern to generate an adjusted characteristic pattern according to a gray scale image dimension of the current gray scale image. The classifier concatenates the adjusted characteristic pattern and the current gray scale image to calculate a class confidence. The classifier determines whether the class confidence is larger than a confidence threshold, and outputs a current classification result if the class confidence is larger than the confidence threshold. A storage device stories the current classification result.

27 Claims, 6 Drawing Sheets

(51) Int. Cl.
G06T 7/90 (2017.01)
G06T 7/73 (2017.01)
G06K 9/66 (2006.01)
G06N 3/04 (2006.01)
(52) U.S. Cl.
CPC ............. G06N 3/0454 (2013.01); G06N 3/08 (2013.01); G06T 7/90 (2017.01)

(56) References Cited

U.S. PATENT DOCUMENTS

| | | | |
|---|---|---|---|
| 2015/0332444 A1* | 11/2015 | Tsuda | G06T 7/90 382/167 |
| 2016/0093291 A1 | 3/2016 | Kim | |
| 2016/0287214 A1* | 10/2016 | Ralovich | A61B 8/483 |
| 2016/0292887 A1* | 10/2016 | Cho | G06K 9/4661 |
| 2016/0364883 A1* | 12/2016 | Shiiyama | G06K 9/6212 |
| 2017/0103308 A1* | 4/2017 | Chang | G06N 3/04 |
| 2018/0137941 A1* | 5/2018 | Chen | G16H 50/50 |
| 2018/0150684 A1* | 5/2018 | Wang | G06T 7/11 |
| 2018/0204111 A1* | 7/2018 | Zadeh | G06N 3/0436 |

FOREIGN PATENT DOCUMENTS

| | | |
|---|---|---|
| CN | 105787458 A | 7/2016 |
| CN | 105868691 A | 8/2016 |
| CN | 106228575 A | 12/2016 |
| TW | 408547 B | 10/2000 |
| TW | 201101814 A | 1/2011 |
| TW | 201413602 A | 4/2014 |
| TW | I572186 B | 2/2017 |

OTHER PUBLICATIONS

J. Pasquet, M. Chaumont, G. Subsol and M. Derras, "Speeding-up a convolutional neural network by connecting an SVM network," *2016 IEEE International Conference on Image Processing (ICIP)*, Phoenix, AZ, 2016, pp. 2286-2290.
N. Ikoma, Y. Haraguchi and H. Hasegawa, "On an evaluation of tracking performance improvement by SMC-PHD filter with intensity image of pedestrians detection over on-board camera using neural network," *2014 World Automation Congress (WAC)*, Waikoloa, HI, 2014, pp. 273-278.
Xingyi Li, Cunqing Wang and Huaji Shi, "A travel time prediction method: Bayesian reasoning state-space neural network," *The 2nd International Conference on Information Science and Engineering*, Hangzhou, China, 2010, pp. 936-940.
A. Polyak and L. Wolf, "Channel-level acceleration of deep face representations," in *IEEE Access*, vol. 3, pp. 2163-2175, 2015.
Jingyang Zhu, et al., "BHNN: a Memory-Efficient Accelerator for Compressing Deep Neural Networks with Blocked Hashing Techniques" 2017 IEEE, pp. 690-695 vol. 978-1-5090.
Masakazu Tanomoto et al, "A CGRA-based Approach for Accelerating Convolutional Neural Networks" 2015 IEEE 9th International Symposium on Embedded Multicore/Many-core Systems-on-Chip, IEEE 2015, Apr. 14, 2016, pp. 73-810.
K. Kang, W. Ouyang, H. Li and X. Wang, "Object Detection from Video Tubelets with Convolutional Neural Networks," *2016 IEEE Conference on Computer Vision and Pattern Recognition (CVPR)*, Las Vegas, NV, 2016, pp. 817-825.
S. Ren, K. He, R. Girshick and J. Sun, "Faster R-CNN: Towards Real-Time Object Detection with Region Proposal Networks," in *IEEE Transactions on Pattern Analysis and Machine Intelligence*, vol. 39, No. 6, pp. 1137-1149, Jun. 1, 2017.
K. Kang et al., "T-CNN: Tubelets with Convolutional Neural Networks for Object Detection from Videos," in *IEEE Transactions on Circuits and Systems for Video Technology*, Aug. 7, 2017, pp. 1-11.
D. Gordon, A. Farhadi and D. Fox, "$Re^3$: Re al-Time Recurrent Regression Networks for Visual Tracking of Generic Objects," in *IEEE Robotics and Automation Letters*, vol. 3, No. 2, pp. 788-795, Apr. 2018.
Z. Cui et al , "Recurrently Target-Attending Tracking," *2016 IEEE Conference on Computer Vision and Pattern Recognition (CVPR)*, 2016, pp. 1449-1458.
Wei Han, et al. Seq-NMS for Video Object Detection *Technical Report for Imagenet VID Competition 2015*, Aug. 22, 2016, pp. 1-9.
Tobias Domhan et al, Speeding up Automatic Hyperparameter Optimization of Deep Neural Networks by Extrapolation of Learning Curves, *IJCAI'15 Proceedings of the 24th International Conference on Artificial Intelligence*, Jul. 25-31, 2015, pp. 3460-3468.
K. Kang et al., "Object Detection in Videos with Tubelet Proposal Networks," *2017 IEEE Conference on Computer Vision and Pattern Recognition (CVPR)*, Honolulu, HI, 2017, pp. 889-897.
X. Zhu, Y. Wang, J. Dai, L. Yuan and Y. Wei, "Flow-Guided Feature Aggregation for Video Object Detection," *2017 IEEE International Conference on Computer Vision (ICCV)*, Venice, 2017, pp. 408-417.
Byungjae Lee et al, "Multi-Class Multi-Object Tracking using Changing Point Detection" *Lecture Notes in Computer Science*, Aug. 30, 2016, pp. 1-16 vol. 9914.
H. Nam and B. Han, "Learning Multi-domain Convolutional Neural Networks for Visual Tracking," *2016 IEEE Conference on Computer Vision and Pattern Recognition (CVPR)*, Las Vegas, NV, 2016, pp. 4293-4302.
G. Zhu, et al, "Robust Visual Tracking with Deep Convolutional Neural Network Based Object Proposals on PETS," *2016 IEEE Conference on Computer Vision and Pattern Recognition Workshops (CVPRW)*, 2016, pp. 1265-1272.
G. Ning et al., "Spatially supervised recurrent convolutional neural networks for visual object tracking," *2017 IEEE International Symposium on Circuits and Systems (ISCAS)*, Baltimore, MD, 2017, pp. 1-4.
Anton Milan et al, "Online Multi-Target Tracking Using Recurrent Neural Networks" *Proceedings of the Thirty-First AAAI Conference on Artificial Intelligence*, Feb. 4-9, 2017, pp. 4225-4232.
Da Zhang et al, "Deep Reinforcement Learning for Visual Object Tracking in Videos", , *Department of Computer Science, University of California at Santa Barbara, Department of Electrical and Computer Engineering*, Apr. 10, 2017, pp. 1-10.

* cited by examiner

OBJECT DETECTING DEVICE, OBJECT DETECTING METHOD AND NON-TRANSITORY COMPUTER-READABLE MEDIUM

This application claims the benefit of Taiwan application Serial No. 106145074, filed Dec. 21, 2017, the disclosure of which is incorporated by reference herein in its entirety.

TECHNICAL FIELD

The disclosure relates in general to an object detecting device, an object detecting method and a non-transitory computer-readable medium, and more particularly to an object detecting device for detecting an object according to a class confidence, an object detecting method and a non-transitory computer-readable medium.

BACKGROUND

In the object tracking method currently used in the electric device, a location of a target object of a next image is predicted and the target object is marked via a bounding box. The bounding box is an enclosed space surrounding the target object. For example, a target object of an image is classified to be a car, and a rectangle box is used to surround the car.

Currently, an efficient object classifying method with correct detection is one of targets to be achieved.

SUMMARY

The disclosure is directed to an object detecting device, an object detecting method and a non-transitory computer-readable medium.

According to one embodiment, an object detecting device. The object detecting device includes a classifier and a storage device. The classifier is used for generating a current color image and a current gray scale image, generating an initial characteristic pattern from the current color image via a neural network algorithm, adjusting a current dimension of the initial characteristic pattern to generate an adjusted characteristic pattern according to a gray scale image dimension of the current gray scale image, concatenating the adjusted characteristic pattern and the current gray scale image to calculate a class confidence, determining whether the class confidence is larger than a confidence threshold, and outputting a current classification result if the class confidence is larger than the confidence threshold. The storage device is coupled to the classifier and used for storing the current classification result.

According to another embodiment, an object detecting method is provided. The object detecting method includes the following steps: A classifier generates a current color image and a current gray scale image. The classifier generates an initial characteristic pattern from the current color image via a neural network algorithm. The classifier adjusts a current dimension of the initial characteristic pattern to generate an adjusted characteristic pattern according to a gray scale image dimension of the current gray scale image. The classifier concatenates the adjusted characteristic pattern and the current gray scale image to calculate a class confidence. The classifier determines whether the class confidence is larger than a confidence threshold, and outputs a current classification result if the class confidence is larger than the confidence threshold. A storage device stories the current classification result.

According to an alternative embodiment, a non-transitory computer readable medium is provided. The non-transitory computer readable medium has a plurality of program codes for performing an object detecting method. The object detecting method includes the following steps: A classifier generates a current color image and a current gray scale image. The classifier generates an initial characteristic pattern from the current color image via a neural network algorithm. The classifier adjusts a current dimension of the initial characteristic pattern to generate an adjusted characteristic pattern according to a gray scale image dimension of the current gray scale image. The classifier concatenates the adjusted characteristic pattern and the current gray scale image to calculate a class confidence. The classifier determines whether the class confidence is larger than a confidence threshold, and outputs a current classification result if the class confidence is larger than the confidence threshold. A storage device stories the current classification result.

Figure 1A:
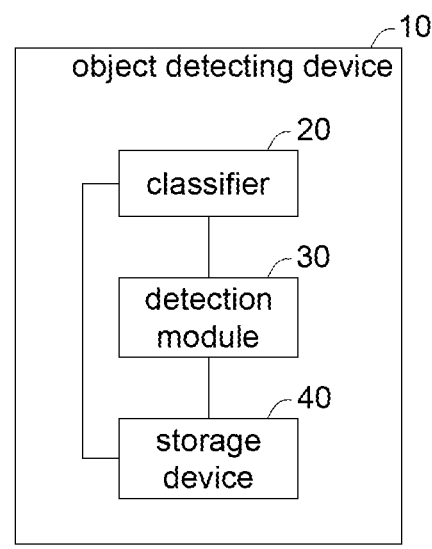
FIG. 1A shows a block diagram of an object detecting device according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Several embodiments are provided with accompanying drawings for detail illustration. It is noted that the embodiment is not used to limit the scope of the present invention. The operation sequence of the structures is not limited according to the description. Any reassemble structure having similar function is within the scope of the present invention. Moreover, the drawings are used for illustration and are not drawn according to the actual size.

Figure 1B:
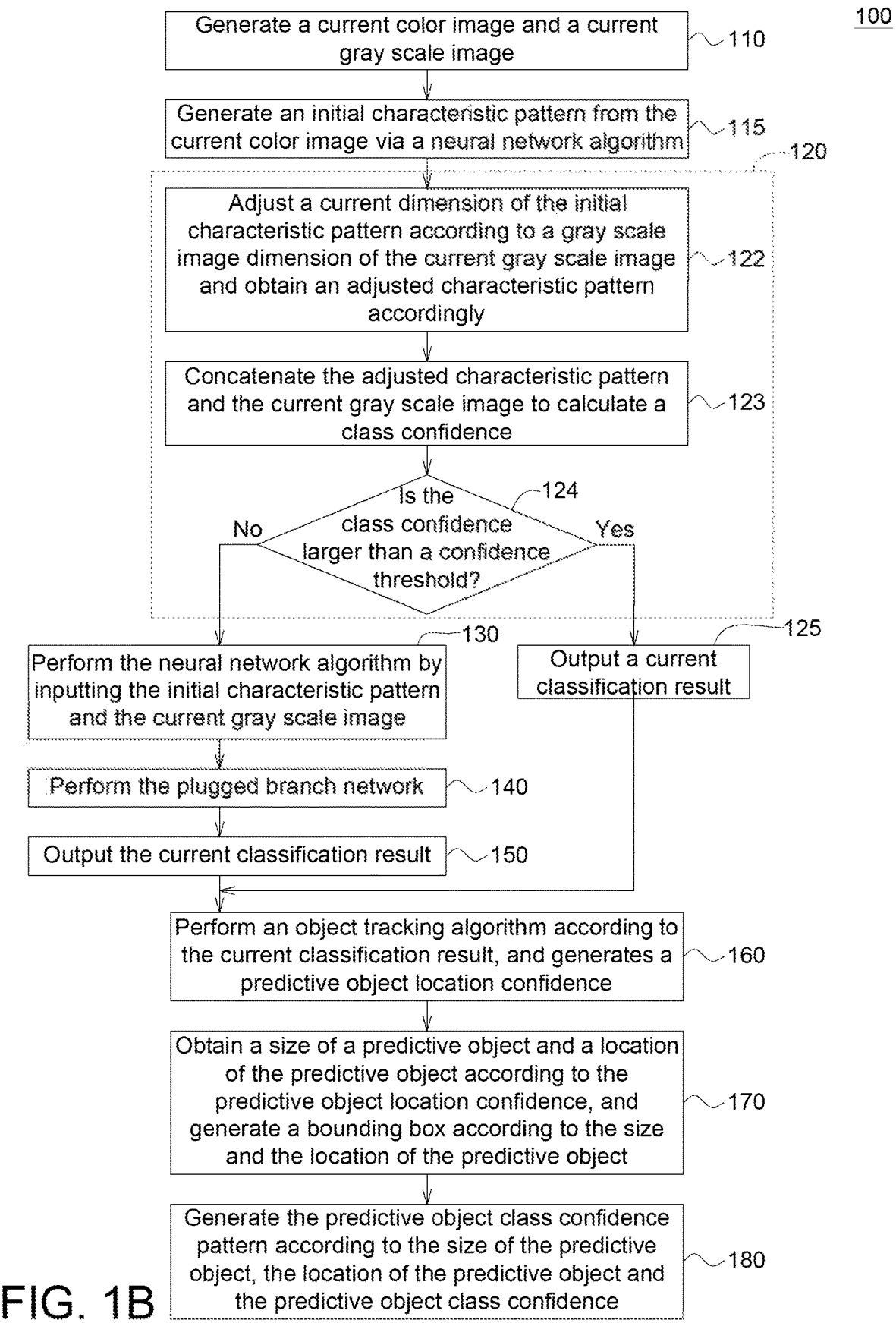
FIG. 1B shows a flowchart of an object detecting method according to one embodiment.

Please refer to FIGS. 1A to 1B. FIG. 1A shows a block diagram of an object detecting device 10 according to one embodiment. FIG. 1B shows a flowchart of an object detecting method 100 according to one embodiment. In one embodiment, the object detecting method 100 can be implemented by the object detecting device 10. The object detecting device 10 includes a classifier 20, a detection module 30 and a storage device 40. The classifier 20 is coupled to the detection module 30. The classifier 20 and the detection module 30 are electrically coupled to the storage device 40 respectively. The classifier 20 and the detection module 30 can be realized by a graphics processing unit (GPU), a microcontroller, a microprocessor, a digital signal processor, an application specific integrated circuit (ASIC) or a logic circuit. The storage device 40 can be realized by a ROM, a flash memory, a soft disk, a hard disk, an optical disk, an USB disk, a magnetic tape, a network accessing database or a storage medium having similar function. In one embodiment, the object detecting method 100 can be performed by a non-transitory computer readable medium having a plurality program codes.

In one embodiment, the classifier 20 receives a current color image and a current gray scale image. An initial characteristic pattern is generated from the current color image via a neural network algorithm. A current dimension of the initial characteristic pattern is adjusted according to a gray scale image dimension and an adjusted characteristic pattern is obtained. The adjusted characteristic pattern and the current gray scale image are concatenated to calculate a class confidence. Whether the class confidence is larger than a confidence threshold is determined. If the class confidence is larger than the confidence threshold, then a current classification result is outputted. The storage device 40 is used for storing the current classification result.

Figure 2:
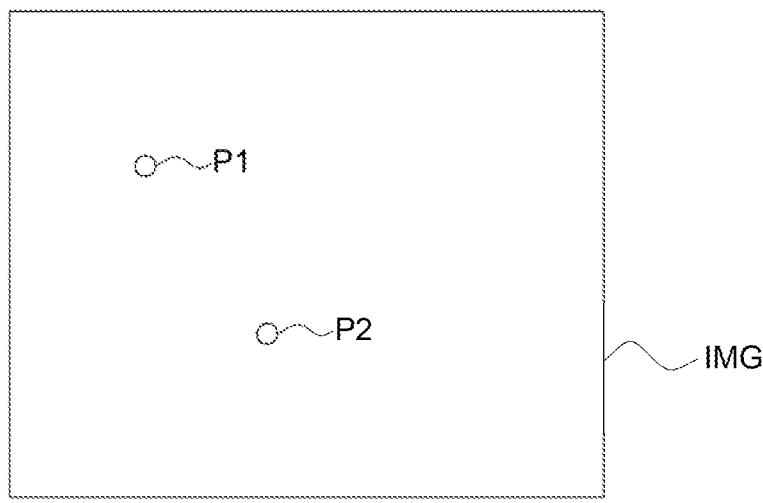
FIG. 2 illustrates a current image characteristic pattern according to one embodiment.

FIG. 2 illustrates a current image characteristic pattern according to one embodiment. For example, in FIG. 2, a current color image IMG includes a first object and a second object. The first object may be a car and the second object may be a pedestrian. Please refer to FIG. 1B and FIG. 2. Before performing the object detecting method 100, the classifier 20 receives a video containing a moving car (first object) and a walking pedestrian (second object). The classifier 20 generates a previous color image and a previous gray scale image according to objects, e.g. the car and the pedestrian, in a first image of the video. The classifier 20 further generates a previous concatenated image and a previous classification result according to the previous color image and the previous gray scale image. The previous color image is a red-green-blue (RGB) image. The steps of the object detecting method 100 are illustrated as follows.

In step 110, the classifier 20 generates a current color image and a current gray scale image.

In one embodiment, the classifier 20 detects a car in a second image of the video and generates the current color image and the current gray scale image according to a location of the car.

A color image and a gray scale image can be obtained according to an image via image processing technology, such as an image transforming algorithm or an image transforming function.

In on embodiment, the classifier 20 further receives the previous classification result generated from the first image. The current color image and the current gray scale image are generated according to the previous classification result generated from the first image, the second image and/or a previous object location confidence. In one embodiment, the previous classification result includes an object class confidence, an object size and/or an object location of the first image. In step 115, the classifier 20 generates an initial characteristic pattern from the current color image via a neural network algorithm.

The neural network algorithm can be realized by some known algorithms, and the details are not described here. In one embodiment, the initial characteristic pattern may include horizontal and/or vertical border of the first object and/or the second object.

Next, the step 120 is performed. In one embodiment, the step 120 is a plugged branch network. For example, the step 120 includes steps 122 to 124. In step 122, the classifier 20 adjusts a current dimension of the initial characteristic pattern according to a gray scale image dimension of the current gray scale image and an adjusted characteristic pattern is obtained accordingly.

In one embodiment, the classifier 20 adjusts the current dimension, such as 8*8 pixels, of the initial characteristic pattern to be identical to the gray scale image dimension, such as 16*16 pixels, and the adjusted characteristic pattern, such as 16*16 pixels, is obtained accordingly.

In step 123, the classifier 20 concatenates the adjusted characteristic pattern and the current gray scale image to calculate a class confidence.

In one embodiment, the classifier 20 concatenates the adjusted characteristic pattern and the current gray scale image to generate a concatenated image. A plurality of pixel values of the concatenated image are inputted to a confidence function, in order to generate the class confidence. The confidence function may be Softmax function.

In step 124, the classifier 20 determines whether the class confidence is larger than a confidence threshold.

For example, the class confidence may be a value greater than or equal to 0. In one embodiment, the class confidence, e.g. with a value from 0 to 1, represents the probability. For example, if the class confidence is 0, the probability is 0%; if the class confidence is 1, the probability is 100%. If the class confidence is larger than the confidence threshold, then the classifier 20 outputs the class confidence as the object class confidence in the step 125.

In one embodiment, the confidence threshold can be preset by the user. For example, the confidence threshold can be preset to be 0.8 or 0.9.

In step 125, the classifier 20 outputs a current classification result. At this time, the classifier 20 assigns the class confidence as the current classification result. In one embodiment, the current classification result includes the object class confidence, the object size and/or the object location of the current color image, such as the current color image of the second image.

In one embodiment, if the confidence threshold is 0.9 and the class confidence is 0.95, the classifier 20 determines that class confidence is larger than the confidence threshold in the step 124. The classifier 20 is confident of the current classification result and the current classification result can be outputted in the step 125 without the following steps. For example, the current classification result is to classify a region including a characteristic point P1 to be a car.

The current classification result is outputted as soon as possible, such that the classification and the detection of single object, such as car, can be more efficient.

If the classifier 20 determines the class confidence is not larger than the confidence threshold in the step 124, then the process proceeds to step 130.

In step 130, the classifier 20 performs the neural network algorithm by inputting the initial characteristic pattern and the current gray scale image.

In one embodiment, the inputs in the step 130 is the initial characteristic pattern obtained at the step 115 and the current gray scale image obtained at the step 110. In the step 130, after the neural network algorithm is performed by inputting the initial characteristic pattern and the current gray scale image, another initial characteristic pattern, which is used for step 140, and another current gray scale image are obtained.

In one embodiment, the classifier 20 transmits an accessing command to the storage device 40, to read out the current color image from the storage device 40, and performs the neural network algorithm by inputting the initial characteristic pattern and the current gray scale image.

In step 140, the classifier 20 performs the plugged branch network.

In one embodiment, the plugged branch network in the step 140 is identical or similar to that in the step 120. In other words, in step 140, the classifier 20 performs the steps 122 to 124 again, for performing the determinations of more images and obtaining a higher class confidence. Once the class confidence in the step 140 is larger than the confidence threshold, the process proceeds to step 150. In one embodiment, several plugged branch networks can be performed according to the actual needs. For example, in the step 140, if the class confidence is not larger than the confidence threshold, then a step similar to the step 130 of performing the neural network algorithm by inputting the initial characteristic pattern and the current gray scale image can be performed again and a step similar to the step 140 of performing the plugged branch network can be performed again.

In step 150, the classifier 20 outputs the current classification result.

In step 160, the detection module 30 performs an object tracking algorithm according to the current classification result, and generates a predictive object location confidence.

In one embodiment, the predictive object location is a central location. The object location confidence is the probability of the center location of the object. If the object moves smoothly and the predictive weighting value in the analysis of the object moving path is high, then the probability that the center of the object is located at this point is high and the probability that the edge of the object is located at this point is low. A characteristic pattern $f_m$ is transformed by a mapping function $P_1$ to obtain a location detection confidence pattern $C_1$. m is the class. $C_1 = P_1 * f_m$. $P_1$ is calculated by the following equation:

$$P_1(x, y) = \frac{1}{\sigma\sqrt{2\pi}}\exp\left(-\frac{(x-\mu_x)^2}{2\sigma^2}\right) \times \frac{1}{\sigma\sqrt{2\pi}}\exp\left(-\frac{(y-\mu_y)^2}{2\sigma^2}\right)$$

In this equation, $P_1(x,y)$ is the probability of object location in the next image according to analyze the moving path of the object in the current image. The shifting parameters $\mu_x$, $\mu_y$ are the predicted object location for adjusting the probability distribution. The scale factor δ is the index of class confidence for adjusting the probability distribution.

In one embodiment, the current classification result is obtained in the step 150 and/or the step 125. The current classification result includes the object class confidence, the object location and/or object size. In step 160, the detection module 30 can perform an object tracking algorithm by inputting the object class confidence, the object location and/or object size, to generate the predictive object location confidence.

In one embodiment, the object size, the object location and the object class confidence obtained in the step 150 can be deemed as the current detection result.

In one embodiment, as shown in FIG. 2, in the step 160, the detection module 30 performs the object tracking algorithm by inputting the current color image IMG to output the characteristic point P1 and the characteristic point P2. The characteristic point P1 is the central point of the first object, such as the car; and the characteristic point P2 is the central point of the second object, such as the pedestrian.

In step 170, the detection module 30 obtains a size of a predictive object and a location of the predictive object according to the predictive object location confidence, and generates a bounding box of a next image (a third image) according to the size and the location of the predictive object.

Figure 3:
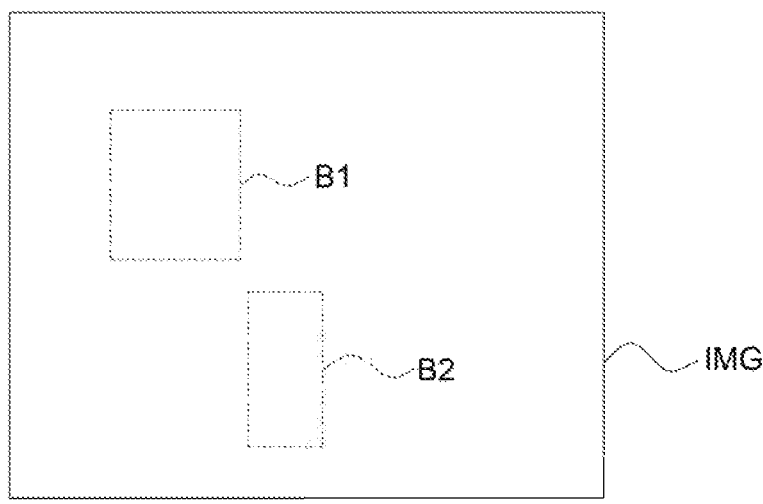
FIG. 3 illustrates a bounding box according to one embodiment.

Please refer to FIG. 1B, FIG. 2 and FIG. 3. FIG. 3 illustrates a bounding box according to one embodiment. As shown in FIG. 3, the detection module 30 obtains the size and the location of the car in the current color image IMG and generates a bounding box B1 according to the predictive object location confidence of the first object (e.g. the car). In one embodiment, the detection module 30 obtains the size and the location of the pedestrian and generates a bounding box B2 according to the predictive object location confidence of the second object (e.g. the pedestrian).

In step 180, the detection module 30 generates the predictive object class confidence pattern according to the size of the predictive object, the location of the predictive object and the predictive object class confidence, and inputs the predictive object class confidence and the current classification result to the step 110.

In one embodiment, the range can be selected according to the bounding box, such as the bounding box B1. For example, the original image is a 1280×720 image, the central point of the bounding box B1 is at (400,600), and the size of the bounding box B1 is (300,300), so the range can be from (400-300/2, 600-300/2) to (400+300/2, 600+300/2). That is to say, the next color image and the next gray scale image whose ranges are (250 to 550, 450 to 750), such as the third image, for performing the step 110.

In one embodiment, the predictive object class confidence pattern may be gray scale pattern. For example, if the predictive object class confidence is high, then the brightness of the predictive object class confidence pattern is high; if the predictive object class confidence is low, then the brightness of the predictive object class confidence pattern is low.

In one embodiment, the predictive object class confidence pattern is an object class confidence pattern of the next image, such as the third image. The size of this object class confidence pattern is identical to the size of the third image. For example, each of the pixels in the third image has a probability value. In one embodiment, those probability values can be graphically represented to be the predictive object class confidence pattern. In one embodiment, the predictive bounding box, such as the bounding box B1, is the bounding box in the next image, such as the third image. The bounding box B1, for example, may only surround the first object. After the step 180 is performed, the process can return to the step 110, to generate a next color image and a next gray scale image of the next image, such as the third image, according to the predictive object class confidence pattern and the bounding box.

In one embodiment, the object class confidence of the previous image can be mapped to the bounding box of the predictive object in the gray scale image via an algorithm, such as a 2D Hann window function.

In one embodiment, in the step 180, the detection module 30 calculates the predictive object class confidence of each pixel in the next image, to generate the predictive object class confidence pattern. In one embodiment, a next gray scale image of the next image can be generated according to the predictive object class confidence pattern. In one embodiment, the predictive object class confidence pattern can be deemed as the next gray scale image of the next image. The detection module 30 transforms the current object class confidence $d_m$ by a mapping function $P_2$ to obtain the object class confidence pattern $C_2$. m is the class. $C_2=P_2*d_m$. The mapping function $P_2$ is calculated by the following equation. w and h are the object size predicted from the predictive bounding box, such as the bounding box B1, and are used to adjust the probability distribution. And, it is determined that whether the location (x,y) is located in the bounding box. If the location (x,y) is not located in the predictive bounding box, then the flag $\mathbb{1}^{obj}$ is set to be zero, such that the class probability is zero; otherwise, the class probability is directly outputted.

$$P_2(x, y) = \mathbb{1}^{obj} \frac{1}{w \times h}$$

The flag $\mathbb{1}^{obj}$ is a Boolean flag of the object. In one embodiment, the value of the flag $\mathbb{1}^{obj}$ may be "1" or "0." For example, if the flag $\mathbb{1}^{obj}$ is "1", an object is located in the predictive bounding box; if the value of the flag $\mathbb{1}^{obj}$ is "0", no object is located in the predictive bounding box.

By performing the step 150, the current object class confidence $d_m$ and the predictive bounding box of the next image can be obtained to know the area of the object in the next color image and the next gray scale image and the object class confidence. In one embodiment, the detection module 30 calculates the predictive object class confidence of the next image, such as the third image, according to the location and the size of the predictive object.

In one embodiment, the detection module 30 generates a predictive location of the predictive object in the next image, such as the third image, according to the location and the size of the predictive object in the current image, such as the second image, then the detection module 300 calculates the predictive object class confidence according to the predictive location in the next image, such as the third image.

In one embodiment, the steps 160 to 180 are used to predict the object size, the object location, the bounding box, the object location confidence and the object class confidence in the next image.

In one embodiment, the detection module 30 outputs the predictive object class confidence to the storage device 40.

In one embodiment, for analyzing the next image, the classifier 20 inputs the current classification result (such as the current classification result of the second image), the next color image (such as the third color image read from the storage device), and the next gray scale image (such as the third gray scale image generated from the second image) to the neural network algorithm.

Figure 4A:
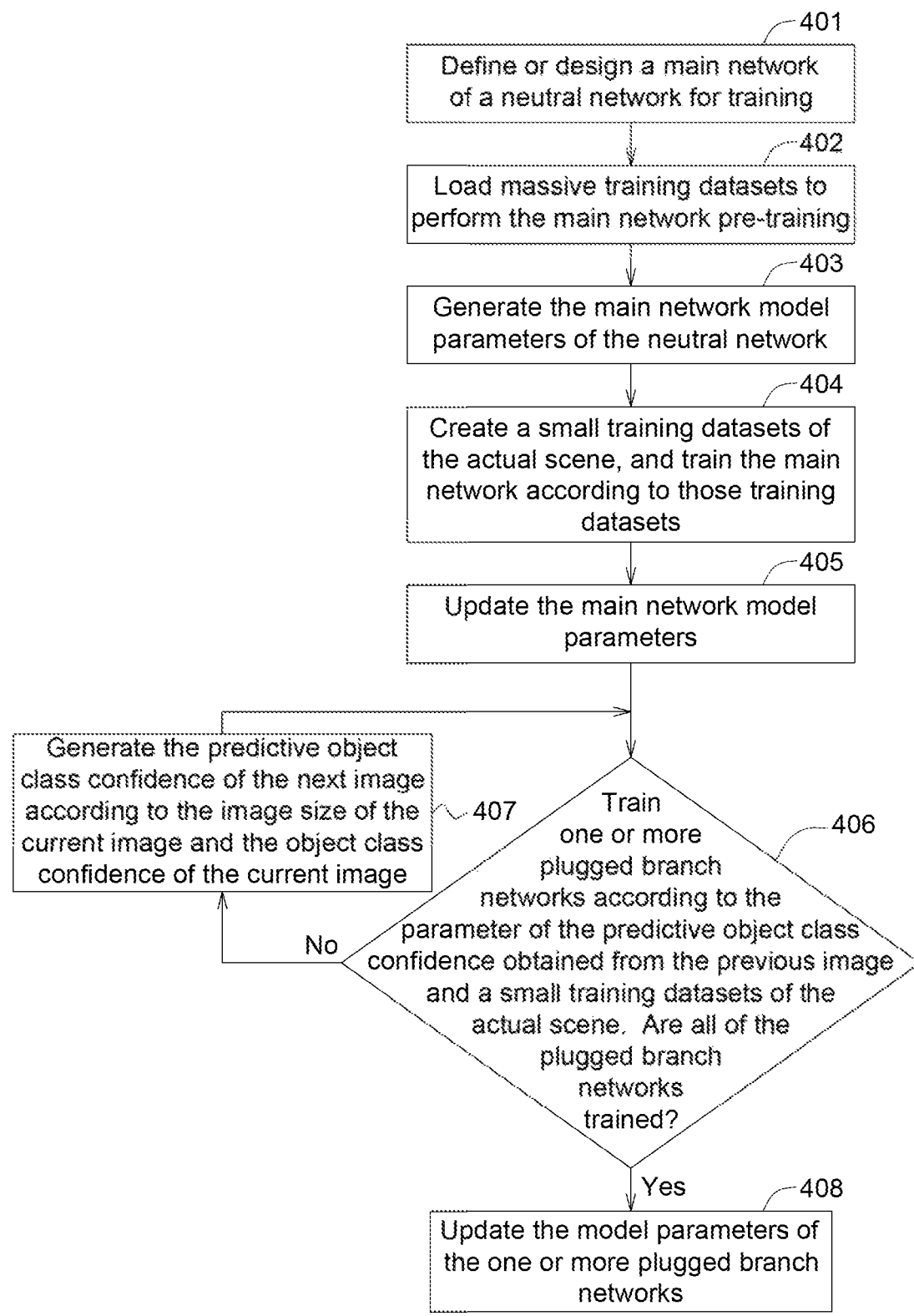
FIG. 4A shows a flowchart of a training method of the class confidence according to one embodiment.

Please refer to FIG. 4A. FIG. 4A shows a flowchart of a training method of the class confidence according to one embodiment.

In step 401, the classifier 20 defines or designs a main network of a neutral network for training. For example, the main network for training of FIG. 4A may be the step 115 and/or the step 130 in FIG. 1B.

In step 402, the classifier 20 loads massive training datasets to perform the main network pre-training. In one embodiment, this way can increase the training accuracy. In one embodiment, if the pre-trained network model parameters can be loaded from network, the process can proceed to step 404.

In step 403, the classifier 20 generates the main network model parameters of the neutral network. In one embodiment, the classifier 20 executes a deep convolutional neural network (DCNN) to generate the main network model parameters.

In step 404, the classifier 20 creates a small training datasets of the actual scene, and trains the main network according to those training datasets. In one embodiment, the adaptability and recognition rate of the actual scene in the network can be increased by performing this step.

In step 405, the classifier 20 updates the main network model parameters.

In step 406, the classifier 20 trains one or more plugged branch networks according to the parameter of the predictive object class confidence obtained from the previous image and a small training datasets of the actual scene. The classifier 20 further determines whether all of the plugged branch networks are trained. If all of the plugged branch networks are trained, then the process proceeds to step 408; if not all of the plugged branch networks are trained, then the process proceeds to step 407. In one embodiment, the plugged branch networks can be implemented via the step 120 of FIG. 1B.

In step 407, the classifier 20 generates the predictive object class confidence of the next image according to the image size of the current image and the object class confidence of the current image.

In step 408, the classifier 20 updates the model parameters of the one or more plugged branch networks.

Base on the above steps, the training procedure of the model of the class confidence is completely performed.

Figure 4B:
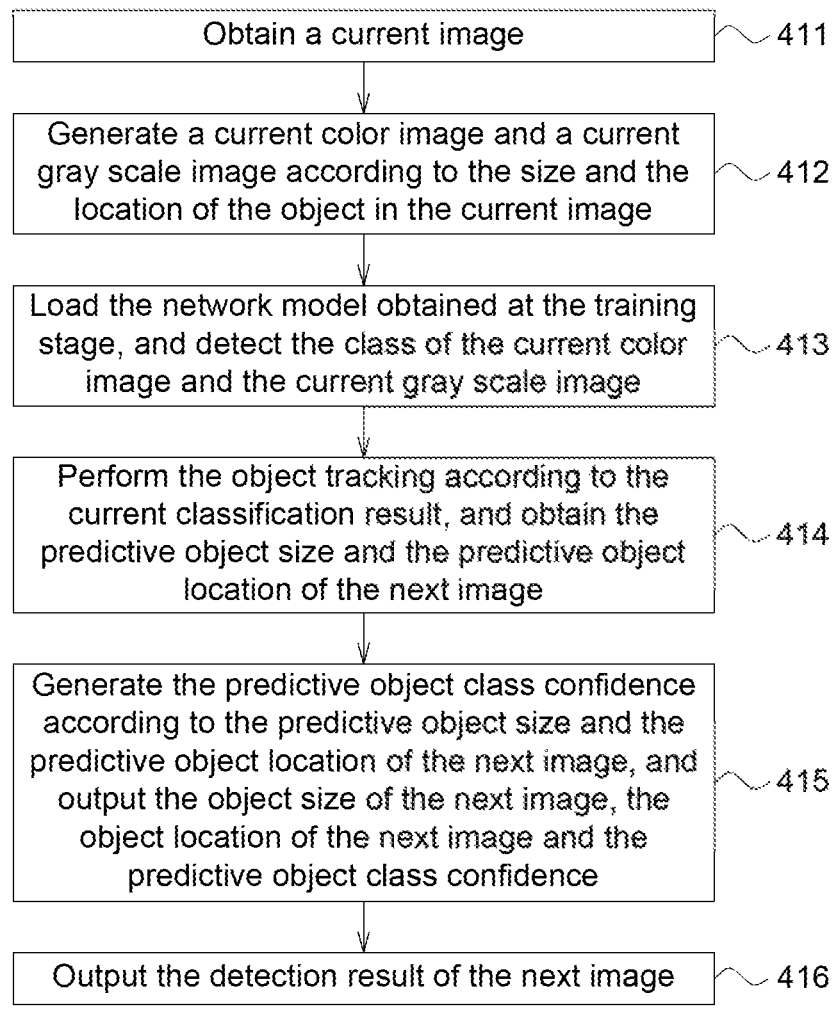
FIG. 4B shows a flowchart of a testing and verifying method of the class confidence according to one embodiment.

As shown in FIG. 4B, FIG. 4B shows a flowchart of a testing and verifying method of the class confidence according to one embodiment. The testing and verifying method includes the following steps.

In step 411, the classifier 20 obtains a current image.

In step 412, the classifier 20 generates a current color image and a current gray scale image according to the size and the location of the object in the current image.

In step 413, the classifier 20 loads the network model obtained at the training stage, and the detection module 30 detects the class of the current color image and the current gray scale image. In one embodiment, the step 413 can be implemented by the steps 120, 125, 130, 140 and 150 of FIG. 1B.

In step 414, the detection module 30 performs the object tracking according to the current classification result, and obtains the predictive object size and the predictive object location of the next image.

In step 415, the detection module 30 generates the predictive object class confidence according to the predictive object size and the predictive object location of the next image, and outputs the object size of the next image, the object location of the next image and the predictive object class confidence.

In step 416, the detection module 30 outputs the detection result of the next image. The detection result of the next image includes the object size, the object location and the class of the next image.

Base on the above steps, the testing and verifying method of the class confidence is completely performed.

Figure 5A:
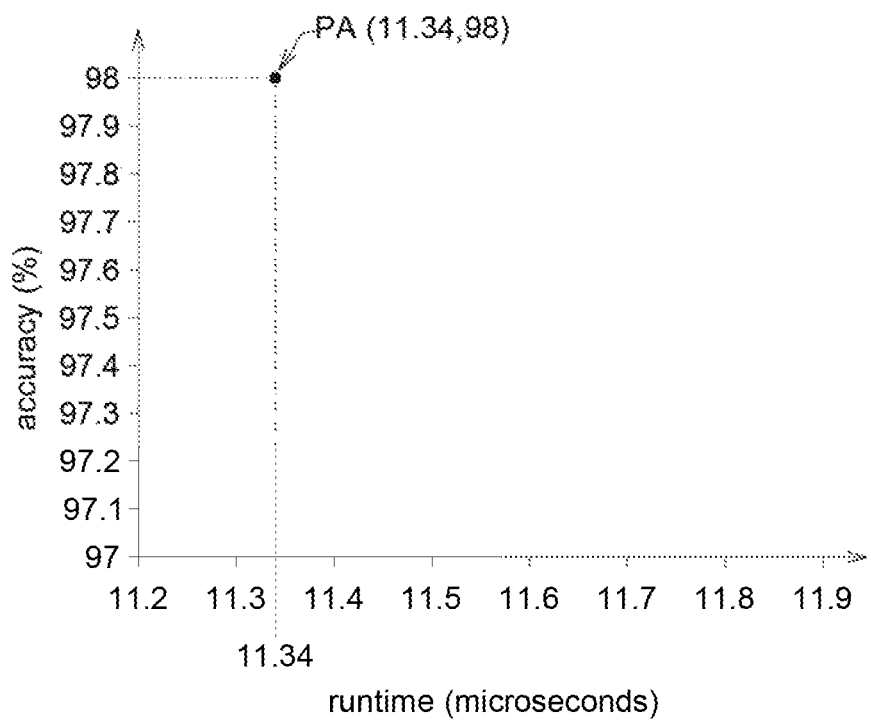
FIGS. 5A to 5B show an experimental data chart of the object detecting method according to one embodiment.
Figure 5B:
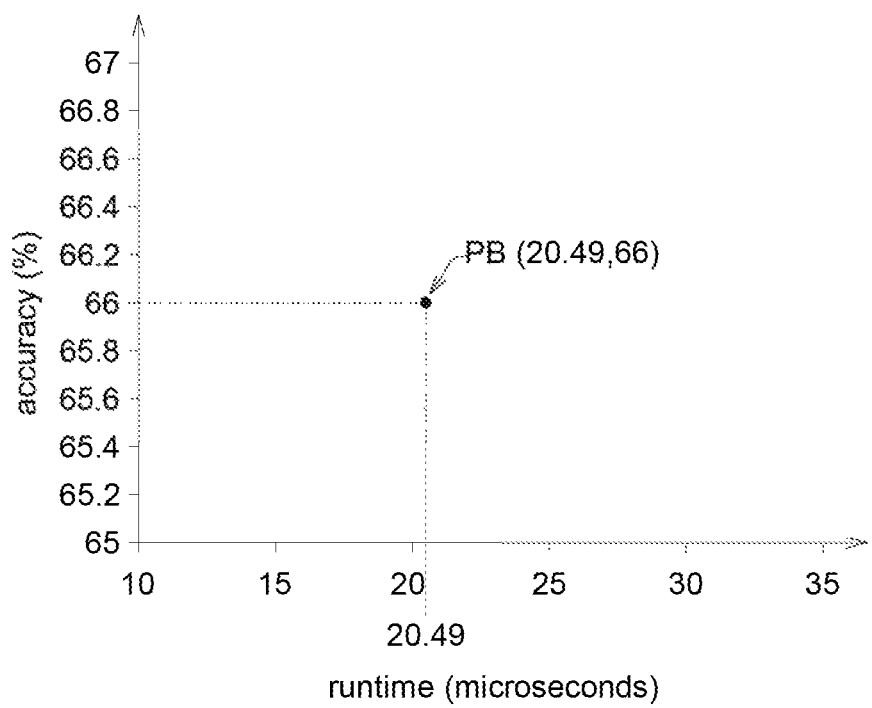

Please refer to FIGS. 5A to 5B. FIGS. 5A to 5B show an experimental data chart of the object detecting method according to one embodiment.

FIG. 5A illustrates the experimental data chart according to the present invention, and FIG. 5B illustrate the experimental data chart according to the conventional Tube Convolutional Neural Network (T-CNN). The parameters in this experiment are described as below: The number of the images for each training is 32, the number of trainings is 3000, the number of the training of the interconnection network is 2000, and the threshold is set as 0.5 or 1. Referring to the measuring point PA in FIG. 5A, when the runtime is 11.34 microseconds, the object detection accuracy is 98%. Referring to the measuring point PB in FIG. 5B, when the runtime is 20.49 microseconds, the objection detection accuracy is 66%. It is appear that the method of the present invention can obtain an accurate detection result in a short time.

According to the object detecting device, the object detecting method and the non-transitory computer readable medium described in the present disclosure, a color image and a gray scale image are obtained from one image. The color image and the gray scale image are used to calculate the class confidence. The class confidence is used to determine the accuracy of the class of the object. The class result is more accurate, so the object detection time is reduced and the accuracy of the object detection is increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An object detecting device, comprising:
a classifier, used for generating a current color image and a current gray scale image, generating an initial characteristic pattern from the current color image via a neural network algorithm, adjusting a current dimension of the initial characteristic pattern to generate an adjusted characteristic pattern according to a gray scale image dimension of the current gray scale image, concatenating the adjusted characteristic pattern and the current gray scale image to calculate a class confidence, determining whether the class confidence is larger than a confidence threshold, and outputting a current classification result if the class confidence is larger than the confidence threshold; and
a storage device, coupled to the classifier and used for storing the current classification result.

2. The object detecting device according to claim 1, wherein the classifier adjusts the current dimension of the initial characteristic pattern to be identical to the gray scale image dimension to generate the adjusted characteristic pattern.

3. The object detecting device according to claim 1, wherein the classifier concatenates the adjusted characteristic pattern and the current gray scale image to generate a concatenated image, and inputs a plurality of pixel values of the concatenated image to a confidence function to generate the class confidence.

4. The object detecting device according to claim 1, wherein if the class confidence is not larger than the confidence threshold, then the classifier performs the neural network algorithm by inputting the initial characteristic pattern and the current gray scale image.

5. The object detecting device according to claim 1, further comprising a detection module, wherein the detection module performs an object tracking algorithm according to the current classification result, and generates a predictive object location confidence.

6. The object detecting device according to claim 5, wherein the detection module obtains a size and a location of a predictive object according to the predictive object location confidence, and generates a bounding box according to the size and the location of the predictive object.

7. The object detecting device according to claim 6, wherein the detection module generates a predictive object class confidence pattern according to the size of the predictive object, the location of the predictive object and a predictive object class confidence.

8. The object detecting device according to claim 7, wherein the detection module generates a next color image and a next gray scale image of a next image according to the predictive object class confidence pattern and the bounding box.

9. The object detecting device according to claim 1, wherein the current classification result is an object class confidence, an object size or an object location.

10. An object detecting method, comprising:
generating, by a classifier, a current color image and a current gray scale image;
generating, by the classifier, an initial characteristic pattern from the current color image via a neural network algorithm;
adjusting, by the classifier, a current dimension of the initial characteristic pattern to generate an adjusted characteristic pattern according to a gray scale image dimension of the current gray scale image;
concatenating, by the classifier, the adjusted characteristic pattern and the current gray scale image to calculate a class confidence;
determining, by the classifier, whether the class confidence is larger than a confidence threshold, and outputting, by the classifier, a current classification result if the class confidence is larger than the confidence threshold; and
storing, by a storage device, the current classification result.

11. The object detecting method according to claim 10, wherein the step of adjusting the current dimension of the initial characteristic pattern to generate the adjusted characteristic pattern according to the gray scale image dimension of the current gray scale image comprises:
adjusting the current dimension of the initial characteristic pattern to be identical to the gray scale image dimension to generate the adjusted characteristic pattern.

12. The object detecting method according to claim 10, wherein the step of concatenating the adjusted characteristic pattern and the current gray scale image to calculate the class confidence comprises:
concatenating the adjusted characteristic pattern and the current gray scale image to generate a concatenated image, and inputs a plurality of pixels values of the concatenated image to a confidence function to generate the class confidence.

13. The object detecting method according to claim 10, wherein if the class confidence is not larger than the confidence threshold, then the neural network algorithm is performed by inputting the initial characteristic pattern and the current gray scale image.

14. The object detecting method according to claim 10, further comprising:
performing an object tracking algorithm according to the current classification result, and generating a predictive object location confidence.

15. The object detecting method according to claim 14, further comprising:
obtaining a size and a location of a predictive object according to the predictive object location confidence, and generates a bounding box according to the size and the location of the predictive object.

16. The object detecting method according to claim 15, further comprising:
generating a predictive object class confidence pattern according to the size of the predictive object, the location of the predictive object and a predictive object class confidence.

17. The object detecting method according to claim 16, further comprising:
generating a next color image and a next gray scale image of a next image according to the predictive object class confidence pattern and the bounding box.

18. The object detecting method according to claim 10, wherein the current classification result is an object class confidence, an object size or an object location.

19. A non-transitory computer readable medium, having a plurality of program codes for performing an object detecting method, wherein the object detecting method comprises:
generating, by a classifier, a current color image and a current gray scale image;
generating, by the classifier, an initial characteristic pattern from the current color image via a neural network algorithm;
adjusting, by the classifier, a current dimension of the initial characteristic pattern to generate an adjusted characteristic pattern according to a gray scale image dimension of the current gray scale image;
concatenating, by a classifier, the adjusted characteristic pattern and the current gray scale image to calculate a class confidence;
determining, by the classifier, whether the class confidence is larger than a confidence threshold, and outputting, by the classifier, a current classification result if the class confidence is larger than the confidence threshold; and
storing, by a storage device, the current classification result.

20. The non-transitory computer readable medium according to claim 19, wherein the step of adjusting the current dimension of the initial characteristic pattern to generate the adjusted characteristic pattern according to the gray scale image dimension of the current gray scale image comprises:
adjusting the current dimension of the initial characteristic pattern to be identical to the gray scale image dimension to generate the adjusted characteristic pattern.

21. The non-transitory computer readable medium according to claim 19, wherein the step of concatenating the adjusted characteristic pattern and the current gray scale image to calculate the class confidence comprises:
concatenating the adjusted characteristic pattern and the current gray scale image to generate a concatenated image, and inputs a plurality of pixels values of the concatenated image to a confidence function to generate the class confidence.

22. The non-transitory computer readable medium according to claim 19, wherein if the class confidence is not larger than the confidence threshold, then the neural network algorithm is performed by inputting the initial characteristic pattern and the current gray scale image.

23. The non-transitory computer readable medium according to claim 19, wherein the object detecting method further comprises:
performing an object tracking algorithm according to the current classification result, and generating a predictive object location confidence.

24. The non-transitory computer readable medium according to claim 23, wherein the object detecting method further comprises:
obtaining a size and a location of a predictive object according to the predictive object location confidence, and generates a bounding box according to the size and the location of the predictive object.

25. The non-transitory computer readable medium according to claim 24, wherein the object detecting method further comprises:
generating a predictive object class confidence pattern according to the size of the predictive object, the location of the predictive object and a predictive object class confidence.

26. The non-transitory computer readable medium according to claim 25, wherein the object detecting method further comprises:
generating a next color image and a next gray scale image of a next image according to the predictive object class confidence pattern and the bounding box.

27. The non-transitory computer readable medium according to claim 19, wherein the current classification result is an object class confidence, an object size or an object location.

* * * * *